Aug. 7, 1923.
S. R. ANDERSON
1,464,125
DIRIGIBLE HEADLIGHT FOR VEHICLES
Filed Jan. 23, 1922
4 Sheets-Sheet 2
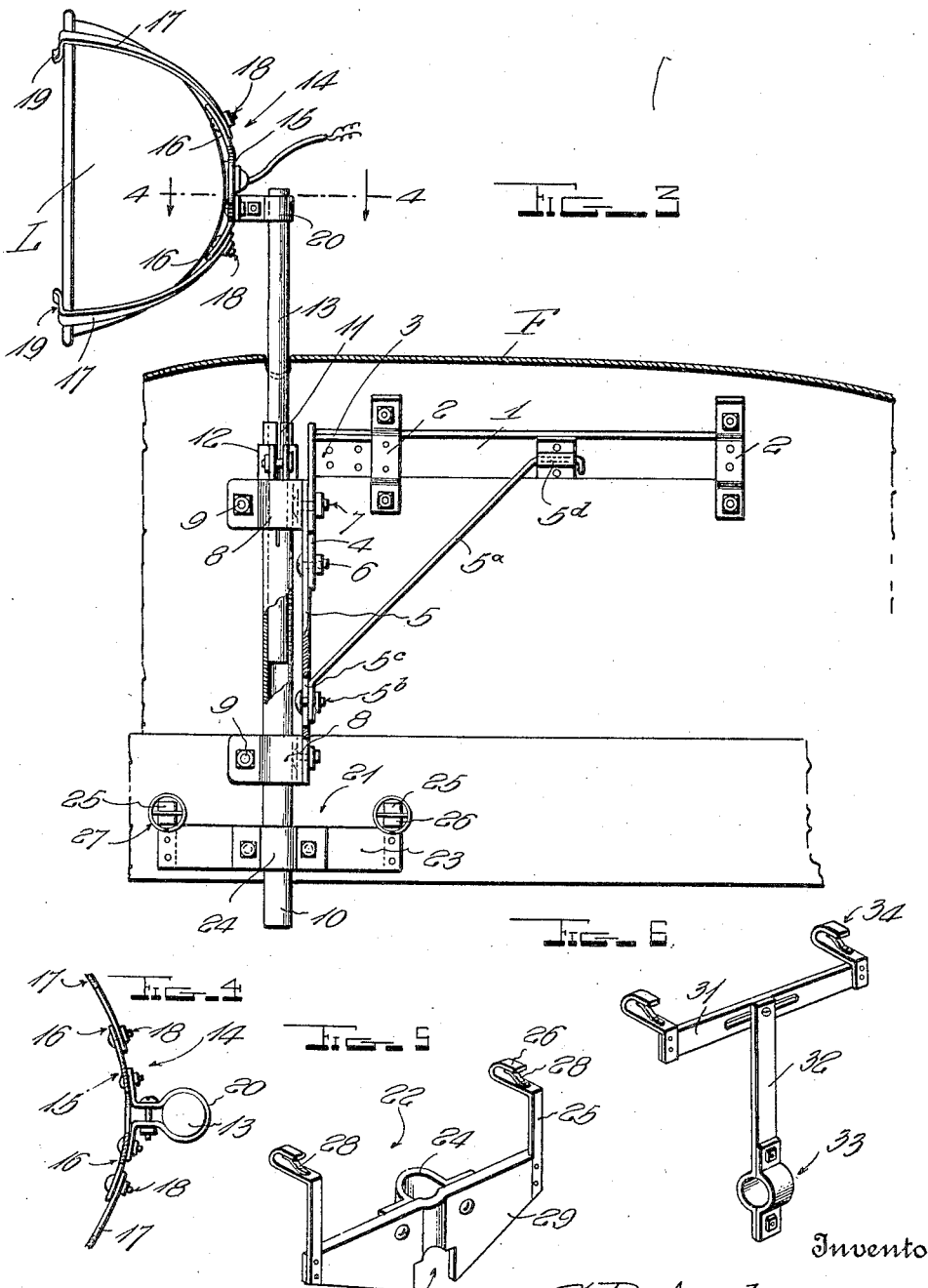
Inventor
S. R. Anderson
By H. R. Wilson & Co.
Attorneys

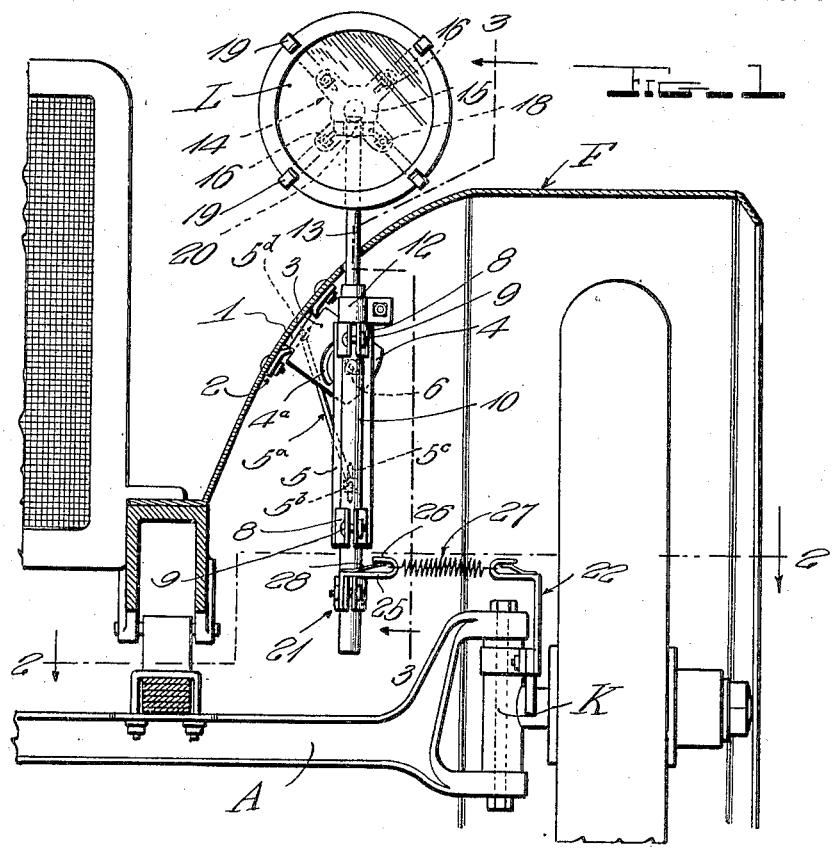

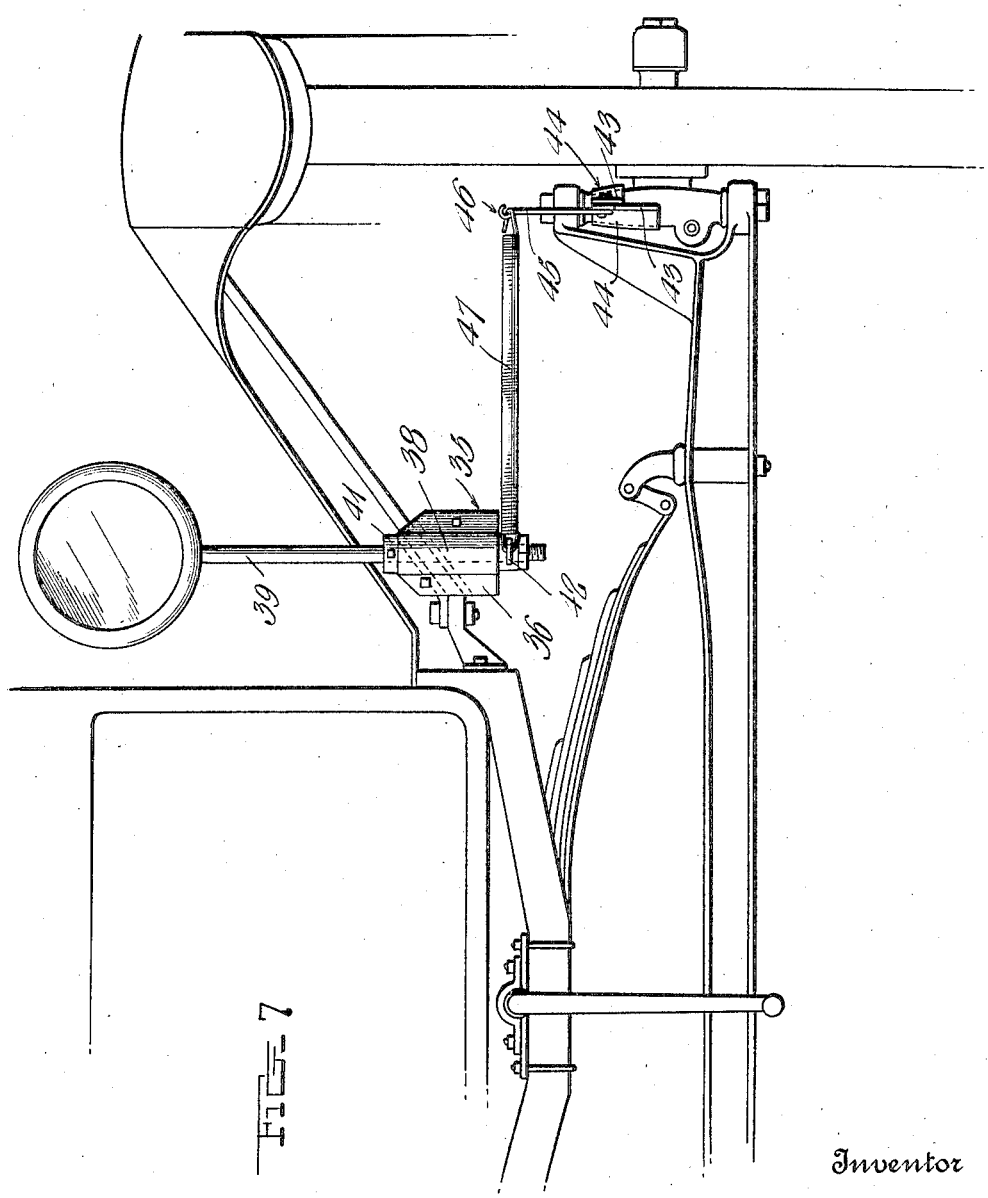

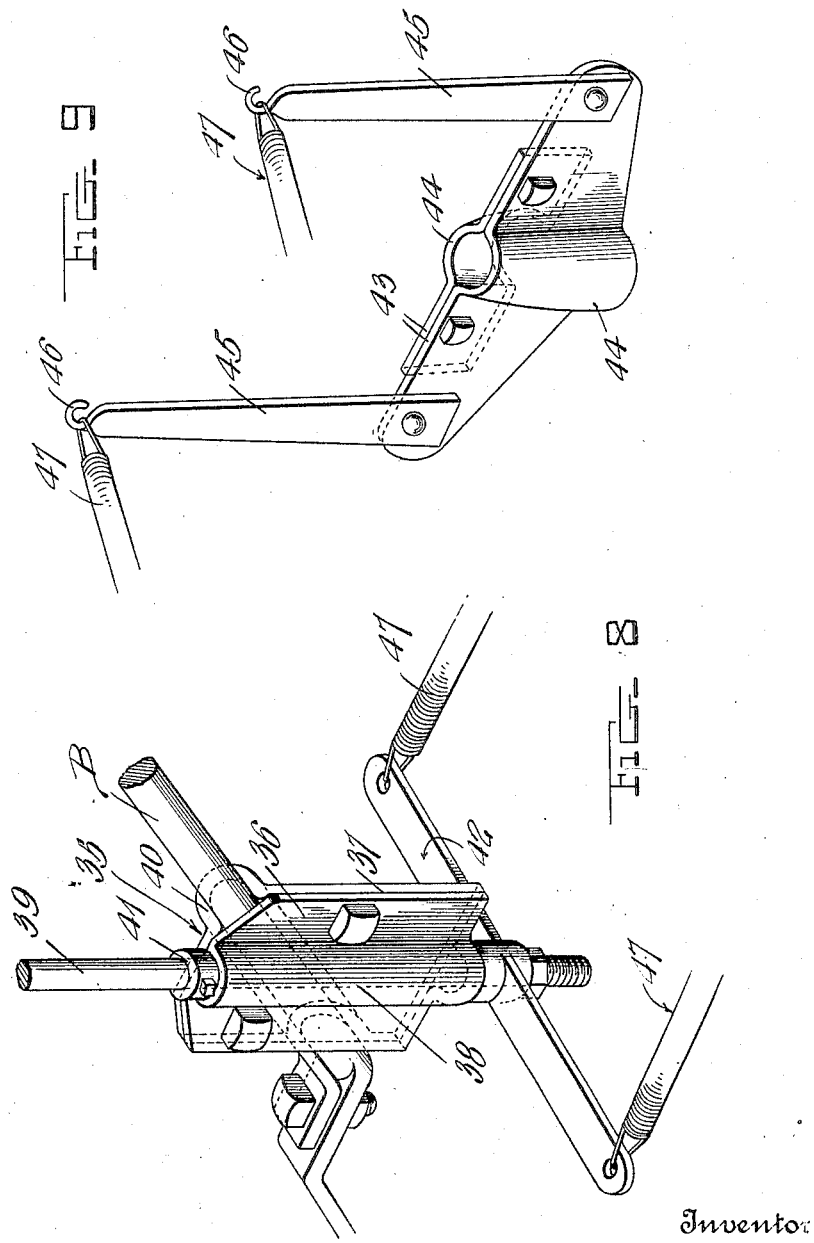

Patented Aug. 7, 1923.

1,464,125

UNITED STATES PATENT OFFICE.

SAMUEL R. ANDERSON, HARDIN, ILLINOIS.

DIRIGIBLE HEADLIGHT FOR VEHICLES.

Application filed January 23, 1922. Serial No. 531,219.

*To all whom it may concern:*

Be it known that I, SAMUEL R. ANDERSON, a citizen of the United States, residing at Hardin, in the county of Calhoun and State of Illinois, have invented certain new and useful Improvements in Dirigible Headlights for Vehicles; and I do declare the following to be a full, clear, and exact description of the invention, such as will enable others skilled in the art to which it appertains to make and use the same.

This invention relates to an improved dirigible headlight for use on vehicles, and it has for its principal object to generally improve upon devices of this type by providing one of simplicity and durability which can be applied without requiring any alterations of the existing parts.

Another object of the invention is to provide a headlight for vehicles which comprises novel means for supporting one of the lights on a fender brace rod or other part of the vehicle so that it is capable of being rotated, there being a bracket connected to the steering knuckle for imparting the rotation to the light, together with a yieldable connection between the bracket and mounting means for the light, which arrangement permits free relative movement of the body of the vehicle with respect to the chassis so that there will be no breakage of parts, as would probably otherwise occur without such a connection.

A further object of the invention is to provide a headlight for vehicles wherein the mounting means in one instance includes a rotatable tube having spring fingers at its upper end to bind against the stem of the lamp-holder which is received therein, this arrangement being advantageous in that it holds the stem against rotation when desired, yet permits the light to be adjusted vertically.

Another object of the invention is to provide a structure embodying a novel holder for the lamp or headlight which is such that it will accommodate different sizes of lamps.

A still further object of the invention is to devise a dirigible headlight which is especially designed for use on Ford automobiles, the parts being so constructed that they can be easily and readily connected with the fender braces and steering knuckles without requiring any alterations of these or other parts of the vehicle.

Other objects and advantages of the invention will be apparent during the course of the following description.

In the accompanying drawings forming a part of this specification and in which like numerals are employed to designate like parts throughout the same:

Figure 1 is an enlarged detail view of the forward portion of a conventional type of automobile equipped with one of my improved dirigible headlights.

Figures 2 and 3 are detail sectional views taken substantially on the planes of the lines 2—2 and 3—3 respectively of Fig. 1.

Figure 4 is a detail sectional view taken substantially on the plane of the line 4—4 of Fig. 3.

Figures 5 and 6 are perspective views of details of the device showing two different forms of brackets adaptable for use on different makes of cars.

Figure 7 is a view similar to Figure 1 showing a slightly modified form of the invention.

Figures 8 and 9 are enlarged detail perspective views of parts employed in this modified form of the invention.

By reviewing the drawings in this case, it will be seen that I have disclosed two forms of dirigible headlight structures which are adapted for different makes of conventional types of automobiles. For the sake of clearness of description, the form of the invention disclosed on the first two sheets of drawings will be described first.

Broadly speaking, the form of the invention to be described first comprises novel attaching means for the headlight which is preferably in the form of a bracket to be attached to the under side of one of the fenders, this bracket being made up of relatively movable parts and one of these carrying bearings in which a vertically disposed tubular member is rotatably mounted. The stem of the headlight holder is disposed in this tube and is capable of vertical adjustment and held against rotation by the arrangement shown. Other brackets are connected, one to the lower end of the tube, and one to the steering member and yieldable means connects these two brackets together so that when the last named is moved with the wheels, the other one is likewise moved and rotation imparted to the tube and headlight holder. Consequently, when the wheels are turned in one direction or the other, the headlight becomes angled according to the direction of movement of the wheels.

In the specific embodiment of the form now under consideration, the mounting means or the attaching bracket for the headlight is made up of a horizontally disposed bar 1 bolted or otherwise detachably connected to the underface of the adjacent fender "F" by means of the U-shaped clips 2 which it carries. An angular plate or member 3 is permanently secured to the forward end of the bar 1 and that portion 4 of this plate which extends in parallelism with the front axle A is equipped with an arcuate slot $4^a$ as better shown in Fig. 1. To this part 4 of the member 3, a vertically disposed bar 5 is bolted or otherwise pivotally connected as indicated at 6. It is to be noted that the upper end of this bar 5 carries another bolt 7 and this extends through the aforesaid arcuate slot $4^a$ so as to permit the bars 1 and 5 to be angled with respect to one another to permit this part of the device to be effectively connected with the different shapes of fenders employed on different makes of cars. To increase the rigidity of the bracket under consideration, I employ a diagonal brace $5^a$ which is adjustably connected at its lower end to the bar 5 as indicated by the bolt and slot connection $5^b$ and $5^c$. At its upper end, the brace is pivotally connected with the bar 1 as indicated at $5^d$. Bolted or otherwise connected with the bar 5 is a pair of upper and lower spring clamps 8 which constitute what may be conveniently termed bearings. By carefully examining these clamps, it will be seen that the ends thereof are separated to serve a purpose to be hereinafter described and these ends are connected together by bolts 9 which pass therethrough. Rotatably mounted in these bearings is a vertically disposed tubular member 10 which has its upper end slotted as at 11 to provide a pair of spring fingers. A clamp 12 of suitable construction surrounds these fingers and serves to bind them tightly against the stem 13 of the lamp holder 14. With this arrangement, it will be seen that the stem 13 will be held against rotation so that it will rotate with the tube 10, but at the same time at will be possible to adjust this stem vertically to raise and lower the headlights L. This leads me to state that any suitable kind of a lamp holder could, of course, be employed. However, I prefer to make use of a special kind of holder which will enable the device to be used in connection with different sizes of headlights. In its preferred form, this holder comprises a center-piece 15 having a central opening for passage of the bulb connection and wires, this piece being equipped with a plurality of radially disposed slotted fingers 16, to which a number of curved arms 17 are adjustably connected and indicated at 18. The outer ends of these arms are bent laterally as indicated at 19 to permit them to be engaged with the headlight to hold the latter in place. By adjusting the connections 18 between the arms and fingers, the holder can be adapted for use on various sizes of lights. It may be added, while on this part of the invention, that the center-piece 15 is equipped with a clamp 20 by means of which it is detachably connected to the upper end of the stem 13.

Referring now to the means for imparting rotation to the tubular part 10, it will be seen that in carrying out this part of the invention, I make use of a pair of brackets 21 and 22 respectively, the first named of which is clamped or otherwise detachably connected to the lower end of the tubular member 10 while the remaining bracket is likewise connected with the steering knuckle K as shown clearly in Fig. 1. Referring in detail to these brackets last mentioned, it will be seen that the one indicated by the numeral 21 includes a cross piece 23 which forms a part of the clamp 24 which is employed to connect it to the rotary tube 10. The cross piece 23 is equipped with angular anchoring arms 25 having hooks 26 on their free ends to which the adjacent eyes of the coiled springs 27 are connected. If desired, small flat springs 28 may be associated with these hooks to prevent accidental displacement of the eyes of the springs. The bracket 22 on the other hand also comprises a horizontal part 29 which is formed intermediate its ends with a notch 30 fitting over the adjacent horizontal part of the steering knuckle as shown in Fig. 1 to assist in preventing displacement of this bracket. This form of bracket is equipped with anchoring arms for the opposite ends of the springs 27 and these arms are constructed exactly like those previously described. In view of this, the same reference characters which are employed to designate the parts of the first named anchoring arms are employed and are also used for the arms on this bracket 22. Both of the brackets under consideration are secured in place by duplicate clamping elements 24.

At this point I am led to state that the type of bracket 22 above described for connection to the steering knuckle is not to be employed under all circumstances and in some makes of cars, the construction thereof must necessarily be changed. I have therefore devised a slightly modified type of bracket which is adaptable for use on several different makes of cars, the same being shown in detail in Fig. 6. By referring to this figure it will be seen that the bracket under consideration comprises a centrally slotted arm 31 with which a vertical arm 32 is adjustably connected, the lower end of which is equipped with suitable attaching means 33 designed for connection to a suitable part of the steering gear. At its opposite ends, the arm 31 is equipped with spring anchoring means 34 which is a duplicate of the anchoring means previously described. In view of this, a detailed description of these spring anchors need not be inserted here. With the type of bracket just described, it will be seen that by loosening the connection between the arms 31 and 32, the latter can be arranged at different angles with respect to one another to enable this form of bracket to be attached to different makes of cars.

Directing attention to the modified form of the invention appearing in Figs. 7 to 9 it will be seen that this comprises a bracket which is designed for attachment to a part of a vehicle, preferably the bracing rod for the front fender, this bracket including a bearing for a vertically disposed cylindrical member, together with a bracket for connection to the steering knuckle and a yieldable connection between the two brackets. It will therefore be seen that the two forms of the invention embody details which are generic and are quite similar.

Specifically described, the form of the invention now under consideration comprises, as above suggested, a bracket 35 for detachable connection with the fender brace B. This bracket in its preferred form is constructed from a pair of plates 36 and 37 which are bolted or otherwise detachably connected together. The first named plate is formed with a vertically disposed channel 38 in which the headlight shaft or stem 39 is rotatably mounted. The remaining plate 37 is formed with an inclined or substantially diagonal channel 40 which is fitted onto the brace B. An adjustable stop collar 41 is fitted onto the light shaft 39. The lower threaded end of the shaft extends below the bracket and a member 42 is non-rotatably connected intermediate its ends therewith in the manner shown.

Co-operative with this member 42 is another bracket which is detachably connected with a steering knuckle. By referring to Figure 9 the specific construction of this bracket will be seen. In its preferred form, it is formed of a pair of clamping plates 43 each of which is formed intermediate its ends with a channeled portion 44 adapted for engagement with the steering knuckle. One of the plates is somewhat longer than the remaining one and vertically disposed arms 45 are riveted or otherwise connected to the extended ends thereof, these arms being formed at their upper free ends with hooks 46 to which yieldable coiled spring connectors 47 are detachably connected. The opposite ends of the spring connectors are connected with arms of the aforesaid cross member 42.

In operation, it will be seen that with the device installed on the machine as shown, when the wheel turns in one direction or the other, the headlights through their connection with the steering knuckles will be turned in the same direction. I am led to state at this point that in the practical embodiment of the invention, it is not absolutely necessary to employ the structure hereinbefore described in connection with each of the lights and by simply connecting the rotary light with the other light by means of a rod and rotatably mounting the last named light in any suitable way, the two lights will be simultaneously rotated. However, if desired, the lights may be rotated independent of each other by duplicating the structure on the opposite side of the car.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A dirigible headlight for vehicles comprising an attaching bracket for a fender brace rod including a pair of clamping plates adapted to be connected with said rod, one of said plates being formed with a vertically disposed channel-shaped portion forming a bearing for the stem of the headlight, a stop collar adapted to be connected to the stem and to rest on the upper end of said bearing, a cross-piece adapted for connection to the lower end of the stem, and a second bracket adapted for connection with the steering knuckle, said last named bracket being composed of a pair of detachably connected clamping plates formed intermediate their ends with oppositely disposed channel-shaped portions shaped to conform to the steering knuckle, a pair of vertically disposed arms connected with one of said plates, the arms being formed at their upper ends with hooks, and a pair of coiled springs connected at one end with the aforesaid cross piece and having detachable connection at their opposite ends with said hooks so as to provide a yieldable connection between the two brackets.

2. A dirigible headlight including an attaching bracket composed of a pair of spaced plates detachably connected together, one of said plates being formed with a vertically disposed channel in which the light shaft is adapted to be rotatably mounted, the other plate being likewise formed with a channel which is inclined and adapted to partially encircle a fender brace rod.

In testimony whereof I have hereunto set my hand.

SAMUEL R. ANDERSON.